July 1, 1969   A. STAMBERA   3,452,857
CHAIN CONVEYOR FOR POURABLE GOODS
Filed Jan. 23, 1967
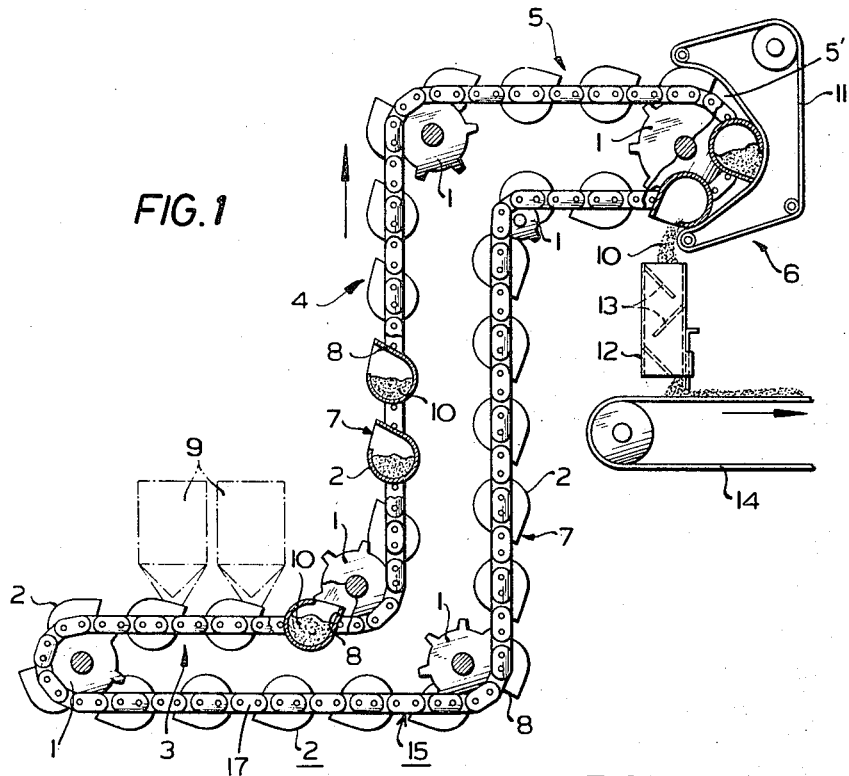
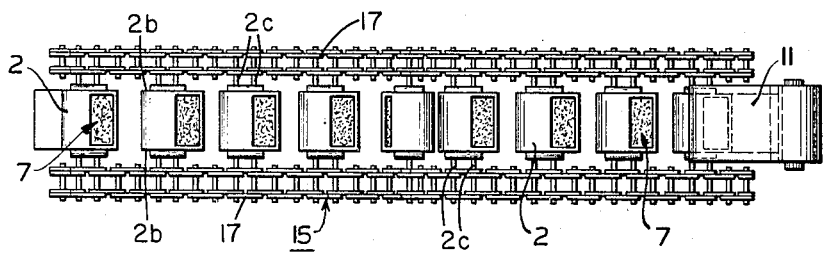
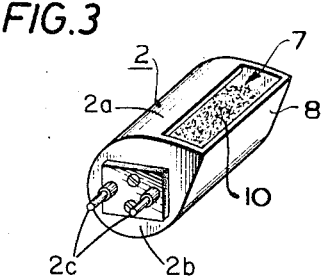
INVENTOR
ADOLF STAMBERA
ATTORNEY United States Patent Office 3,452,857
Patented July 1, 1969

3,452,857
CHAIN CONVEYOR FOR POURABLE GOODS
Adolf Stambera, Stuttgart-Bad Cannstatt, Germany, assignor to Fr. Hesser Maschinenfabrik A.G., Stuttgart-Bad Cannstatt, Germany
Filed Jan. 23, 1967, Ser. No. 610,944
Claims priority, application Germany, Jan. 22, 1966,
H 54,354
Int. Cl. B65g *17/12*
U.S. Cl. 198—152                8 Claims

ABSTRACT OF THE DISCLOSURE

A chain conveyor carrying rigidly attached buckets of the open type. The conveyor is adapted to rise vertically from one horizontal plane to a second elevation. The buckets are constructed and, more particularly, the location of the bucket opening is chosen to prevent spillage or discharge, and during downturn movements a protective band covers and bears against the bucket opening.

---

The invention relates generally to a chain conveyor provided with buckets particularly for transporting granular, pourable, or small piece goods such as macaroni, and more particularly, concerns a chain conveyor of the type which is effective to transport the product-containing buckets to different elevations.

In the prior art chain conveyors with buckets rigidly attached thereto are already known. However, such systems are generally used, at the present time, only for transporting the goods-containing buckets on a relatively flat horizontal plane without moving same along a steep incline or a vertical plane. This condition arises from the fact that the buckets are open and move identically along with the conveyor without changing its relative position so that any significant angle of inclination that the conveyor encounters causes the goods within the buckets to be spilled or poured out.

For this reason it has become necessary in those cases where an appreciable incline is required to movably connect the buckets to the individual links of the chain conveyor in such a manner that the buckets will retain their relative position in space without regard to the particular position or slope of the conveyor chain. Such chain conveyors require, however, elaborate joints, links and guides for moving the buckets and thus appreciably contribute to an increase in the cost for such devices.

The present invention avoids these disavantages by an improvement of the standard chain conveyor in which the buckets are rigidly secured to the chain links. More specifically, in accordance with the invention, the conveyor buckets are constructed in such a manner that the transverse cross-section is either polygonal or circular and, assuming the bucket to be in a horizontal plane, the opening of the bucket extends towards the horizontal center line of the bucket at the outward end thereof at an inclined angle of at least ninety degrees.

In order to facilitate the filling of such buckets, the bucket wall defining the opening at the outward side is constructed in such a manner that the same extends from slightly below the aforementioned center line and then follows upwardly, slightly askew, forming a tangent relative to the generally circular cross-section of the bucket and terminates, approximately at the height of the opposing edge of the bucket opening.

The bucket chain conveyor in accordance with this invention may be turned from a horizontal plane ninety degrees, in other words, directly from a horizontal to a vertical plane, or vice versa. In as much as the chain conveyor system is devoid of joints and guides, commonly used in the prior art, the system is relatively light and thus requires a correspondingly lower drive capacity.

The discharge of the conveyor bucket is also very simple. It merely requires a suitable downward movement of, for instance, ninety degrees of the bucket-carrying conveyor chain. In order to preclude a premature discharge of the goods, a protective cover band may be arranged adjacent to the buckets while the same are in process of turning downwardly. Such band bears against the bucket and completely cover the opening thereof.

It is therefore the primary object of this invention to provide a chain conveyor system with buckets rigidly attached thereto which is more efficient in operation and avoids the disadvantages and limitations of the prior art devices.

It is a further and more specific object of this invention to provide a bucket-type chain conveyor system which is effective to elevate the buckets from horizontal to different elevations regardless of the fact that the buckets have unprotected openings.

It is a further and more specific object of this invention to provide a chain conveyor system with buckets secured thereto in which the need for elaborate links, guides and mechanisms are eliminated and in which the cost for such systems can be reduced.

It is a further object of this invention to provide a bucket for the aforementioned conveyor system in which the bucket opening is uniquely located to prevent a premature discharge of the products contained therein.

It is a still further object of this invention to provide a chain conveyor system in which a protective cover band bears upon the conveyor buckets during downward movement thereof to prevent premature spillage and discharge.

For a better understanding of the present invention, together with other and further objects thereof, reference is had to the following description taken in connection with the accompanying drawings and their scope will be pointed out in the appended claims.

In the drawing:
FIGURE 1 is a side view of the chain conveyor in accordance with this invention and of associated fill and discharge stations;
FIGURE 2 is a plan view of the chain conveyor system shown in FIGURE 1; and
FIGURE 3 is a perspective view of a typical chain conveyor bucket.

Referring now to FIGURES 1 and 2 there is shown in the drawing an endless chain conveyor 15 guided by a plurality of turn rolls 1 to cause the chain conveyor to move a horizontal distance 3, a vertical distance 4 and again a horizontal distance 5, the latter being located adjacent to a discharge station 6.

In accordance with this invention there is secured to the chain conveyor 15 a plurality of buckets 2. Each bucket extends transverse to the length of the conveyor 15 and is rigidly connected at opposite ends to chain links 17. The aforesaid connection prohibits relative movement between the bucket 2 and the conveyor chain 15.

In the preferred embodiment each bucket structure 2, see FIGURE 3, is comprised of a circumferential central portion 2a having a generally cylindrical configuration as hereafter further described and end walls 2b provided with connecting studs 2c which extend into and through links 17. Alternatively, the transverse cross-section of the bucket 2 may be polygonal, with for instance curved surfaces between the corner points. The circumference of the circular cross-section of the preferred bucket 2 is discontinuous to provide a longitudinally extending opening 7 between the end walls 2b. The opening 7 is dimensioned to approximate an arcuate distance of about 90° of the circular circumference of the central portion 2a. One circumferential end section of central portion 2a which defines the location of opening 7 terminates substantially proximate to the top apex of the bucket periphery. The other end of the circumference of the central portion 2a is defined by circumferential wall section 8 which extends angularly upward from a point slightly below the horizontal center line of the bucket circle. The wall section 8 is obliquely slanted away from the central axis of the bucket defining an included angle of more than 90° relative to the transverse axis of the bucket and terminating approximately at the height of the aforementioned apex of the circumference. In this position the wall section 8 may be said to be located tangent relative to the circular cross-section of the bucket 2. The aforedescribed construction results in a funnel-like opening which facilitates the filling of the buckets.

In FIGURES 1 and 2 there is shown, by way of example, that the conveyor buckets 2 pass along the horizontal distance 3 under two supply stations 9 which are adapted to fill the buckets 2 with macaronis 10 is similar goods. Once the filled buckets have reached the extremity of the horizontal section 5, the conveyor section is caused to turn downwardly 180° to discharge the goods from the buckets.

In order to assure that the discharge occurs at the proper moment and location there is provided a cover band 11 which bears against the filled buckets and more particularly covers the opening 7 thereof to prevent any premature spillage. As shown, the cover band 11 is arranged in juxtaposition to the turn stretch 5' of the horizontal section 5. As the individual buckets approach the turn stretch 5' the upper circumference thereof, which includes opening 7, passes in relatively tight contact completely underneath the cover band 11 and maintains this sealing contact for about 180° until the bucket 2 has reached the desired discharge location. The cover band 11 may be driven at the same rate of speed as the chain conveyor 15, or may be arranged to run loosely in bearing contact with the buckets during the downturn movement.

In the exemplary embodiment, the buckets 2 are discharged into a chute 12, arranged in suitable proximity to the discharge point, and the chute is provided with a plurality of guide metals 13 to suitably transfer the goods 10 upon an another conveyor band 14.

It will be appreciated that, in accordance with this invention, the chain conveyor may be constructed with different angles of inclinations. It should be noted that in those instances in which the conveyor travels along a slope having a gradient of less than 90°, the circumferential width of the opening 7 of bucket 2 may be increased correspondingly, subject of course to the particular requirements of the task at hand.

While there have been described what are at present considered to be the preferred embodiments of this invention, it will be obvious to those skilled in the art that various changes and modifications may be made therein without departing from the invention, and it is, therefore, aimed in the appended claim to cover all such changes and modifications as fall within the true spirit and scope of the invention.

I claim:
1. A conveyor system for pourable goods, comprising: an endless chain constructed and arranged for horizontal and substantially vertical travel; a plurality of buckets rigidly secured to said endless chain, each of said buckets having a generally tubular configuration with axial ends and a central portion, the circumference of said central portion being substantially annularly shaped in three contiguous quadrants and discontinuous in the fourth quadrant to provide a longitudinally extending opening between the axial ends, one circumferential end section of the central portion defining said opening in said fourth quadrant being slanted obliquely relative to the transverse axis of the bucket.

2. A chain conveyor according to claim 1, wherein the included angle between said circumferential end section and said transverse axis is at least 90°.

3. A chain conveyor for pourable goods and a plurality of buckets rigidly secured to said conveyor, wherein the improvement comprises: that each of said buckest is formed of generally tubular configuration and includes axial ends and a central portion, the circumference of said central portion being discontinuous to provide a longitudinally extending opening between the axial ends, one circumferential end section of the central portion defining said opening being slanted obliquely relative to the transverse axis of the bucket; said chain conveyor being arranged to transport said buckets proximate to a discharge station; and a continuous cover band having a transverse width at least the longitudinal length of said opening, said cover band being placed in juxtaposition to said conveyor adjacent to said discharge station for sealing said opening during downward movement of the bucket prior to reaching its discharge position.

4. A chain conveyor according to claim 3, wherein said cover band simultaneously seals a plurality of buckets.

5. A chain conveyor according to claim 3, wherein said conveyor and said cover band are driven at the same rate of speed.

6. A conveyor system for pourable goods, comprising: an endless chain constructed and arranged for horizontal and substantially vertical travel; a plurality of buckets rigidly secured to said endless chain, each of said buckets having a generally tubular configuration with axial ends and a central portion, the circumference of said central portion being discontinuous to provide a longitudinally extending opening between the axial ends, one circumferential end section of the central portion defining said opening being slanted obliquely relative to the transverse axis of the bucket; and wherein said central portion is predominantly circular and said circumferential end section is located tangent to the main circular body and extends from below the transverse center line of the bucket and the included angle between said circumferential end section of the transverse axis is at least 90°.

7. A chain conveyor according to claim 6, wherein said circumferential end section terminates substantially at the height of the apex of the generally circular bucket body.

8. A chain conveyor according to claim 6, wherein the end opposite to said circumferential end section terminates proximate to the said apex.

References Cited

UNITED STATES PATENTS

| | | | |
|---|---|---|---|
| 2,557,325 | 6/1951 | Transeau | 198—141 |
| 669,571 | 3/1901 | Berghoefer | 198—140 X |
| 941,045 | 11/1909 | Sauerman | 198—140 X |

EDWARD A. SROKA, Primary Examiner.

U.S. Cl. X.R.

198—165